(12) United States Patent
Pearson

(10) Patent No.: US 10,954,786 B2
(45) Date of Patent: Mar. 23, 2021

(54) FEEDER

(71) Applicant: MMD Design & Consultancy Limited, Somercotes (GB)

(72) Inventor: Christopher Pearson, Somercotes (GB)

(73) Assignee: MMD Design & Consultancy Limited, Somercotes (GB)

( * ) Notice: Subject to any disclaimer, the term of this patent is extended or adjusted under 35 U.S.C. 154(b) by 0 days.

(21) Appl. No.: 16/621,468

(22) PCT Filed: Jun. 13, 2018

(86) PCT No.: PCT/GB2018/051603
§ 371 (c)(1),
(2) Date: Dec. 11, 2019

(87) PCT Pub. No.: WO2018/229476
PCT Pub. Date: Dec. 20, 2018

(65) Prior Publication Data
US 2020/0173279 A1 Jun. 4, 2020

(30) Foreign Application Priority Data

Jun. 14, 2017 (GB) .................................. 1709467.3

(51) Int. Cl.
*E21C 47/04* (2006.01)
*B65G 15/24* (2006.01)
(Continued)

(52) U.S. Cl.
CPC .............. *E21C 47/04* (2013.01); *B65G 15/24* (2013.01); *B65G 21/12* (2013.01); *B65G 41/008* (2013.01);
(Continued)

(58) Field of Classification Search
CPC .. B65G 41/001; B65G 41/002; B65G 41/003; B65G 41/005; B65G 41/007; B65G 41/008
See application file for complete search history.

(56) References Cited

U.S. PATENT DOCUMENTS 3,889,796 A   6/1975  Baily et al.
4,184,581 A * 1/1980  Crawshay .............. B65G 65/04
                                              198/301
(Continued)

FOREIGN PATENT DOCUMENTS

DE   3217745 A1     11/1983
GB   2222995 A       3/1990
WO   WO-8802731 A1   4/1988

OTHER PUBLICATIONS

Martin, Benoit; International Search Report for PCT/GB2018/051603; dated Sep. 21, 2018; 4 pages.

*Primary Examiner* — Mark A Deuble
(74) *Attorney, Agent, or Firm* — Shackelford, Bowen, McKinley & Norton, LLP

(57) ABSTRACT

A feeder is described for the conveyance of material such as overburden or mineral from a working site, the feeder comprising a feed device having a material receiving end having a material receiving apron suitable for receiving material such as overburden or mineral at a working site; a material discharge end distal of the material receiving end; an endless conveyor disposed between the material receiving apron and the discharge end so as in use to cause material received at the material receiving apron to be conveyed to the material discharge end; a chassis supporting the feed device; a transport carriage supporting the chassis and adapted to cause the feeder to be movable across a surface for deployment in use. A system A system and method for (Continued)

the movement of material from a working site for example via transport trucks are also described.

24 Claims, 2 Drawing Sheets

(51) Int. Cl.
  *B65G 21/12* (2006.01)
  *B65G 41/00* (2006.01)
  *B65G 47/19* (2006.01)
  *B65G 67/10* (2006.01)
(52) U.S. Cl.
  CPC .............. *B65G 47/19* (2013.01); *B65G 67/10* (2013.01); *B65G 2201/045* (2013.01); *B65G 2203/0241* (2013.01)

(56) References Cited

U.S. PATENT DOCUMENTS

| | | | |
|---|---|---|---|
| 4,345,680 A * | 8/1982 | Kay | B65G 41/002 198/302 |
| 10,100,470 B2 * | 10/2018 | Berning | E01C 23/01 |
| 2011/0248900 A1 | 10/2011 | de Rochemont | |
| 2013/0118862 A1 | 5/2013 | Stewart | |
| 2015/0138032 A1 | 5/2015 | Yona et al. | |
| 2015/0175363 A1 * | 6/2015 | Lowery | E02F 3/32 198/308.1 |
| 2016/0114982 A1 | 4/2016 | Lichtberger | |
| 2019/0367292 A1 * | 12/2019 | Aga | B65G 67/08 |

* cited by examiner

FEEDER

FIELD OF THE INVENTION

This invention relates to a feeder apparatus, system and method for the movement of material from a working site. The invention relates in particular to an overburden or mineral feeder and a system and method of handling overburden or mineral, for example for use in opencast mining.

BACKGROUND TO THE INVENTION

In mineral operations such as open-cast mining of coal, significant volumes of material need to be handled at and removed from the working site. First, a large volume of material, known as overburden, has to be removed and disposed of before access is gained to the minerals of interest. Then, the minerals of interest need to removed.

For large scale overburden/mineral removal operations, use may be made of excavation machinery such as draglines as the primary load-bearing tools to move material. These machines have been developed on a huge scale. The use of shovels to load trucks is another commonplace method. Whilst truck-shovel loading is not necessarily as cost effective as dragline removal per volume of overburden or mineral removed, it offers more flexibility in removal of overburden material or mineral.

Problems associated with truck-shovel loading include those associated with ensuring that an individual truck is loaded fully and efficiently, and those associated with the essentially batch-process nature of filling discrete trucks.

In particular, a process which requires a truck to reverse into position prior to filling, to be filled by a shovel, and then to drive out requires periodic suspension of the shoveling operation when there is no truck in place. A shovel may not be well adapted to distributing the overburden/mineral efficiently in the truck. The relatively large capacity of a shovel, say 100 t, and the consequence that relatively few shovel loads that might therefore be sufficient to fill a truck, tend to make it harder to get anywhere towards 100% fill efficiencies.

Each of these factors may tend to mean that truck-shovel loading is relatively inefficient, both in terms of effectiveness of truck fill, and in terms of volume processing rates.

SUMMARY OF THE INVENTION

In accordance with the invention in a first aspect, a feeder is provided for the conveyance of material such as overburden or mineral, the feeder comprising:
  a feed device having:
  a material receiving end having a material receiving apron suitable for receiving material such as overburden or mineral at a working site;
  a material discharge end distal of the material receiving end;
  an endless conveyor disposed between the material receiving apron and the discharge end so as in use to cause material received at the material receiving apron to be conveyed to the material discharge end;
  a chassis supporting the feed device;
  a transport carriage supporting the chassis and adapted to cause the feeder to be movable across a surface for deployment in use.

In an intended application in the context of the movement of material such as overburden or mineral using truck-shovel loading principles, the intention is that the feeder in accordance with the first aspect of the invention sits between the shovel, which supplies material such as overburden or mineral to the material receiving apron, and the truck, which is supplied by material such as overburden or mineral from the material discharge end.

Two distinctly characteristic features of the feeder in accordance with the first aspect of the invention serve to facilitate more efficient material handling in a truck-shovel loading system.

First, the combination of a material receiving apron and a continuous conveyor to cause material received at the material receiving apron to be conveyed to the material discharge end means that the feeder functions as a surge conveyor. As a result, discrete batch supply from the shovel at the apron end may be converted to a more even continuous supply at the discharge end. This facilitates more even loading of the truck, and makes it more likely that load levels of nearer 100% can be achieved. Additionally, subject to appropriate capacity design for the apron region, it may be possible to continue to supply the apron via the shovel whether a truck is immediately in place or not, increasing overall throughput volumes.

Second, the transport carriage supporting the chassis on which the feed device itself sits makes the feeder mobile, so that it can be brought into and out of a desired operational position as required, co-operating with the movement of the operational front and the movement of the trucks to improve operational efficiency.

Thus, in accordance with the invention in a second aspect, a system for the movement of material such as overburden or mineral from a working site comprises:
  a material shovel having a bucket adapted to pick up material and move the material from a work front;
  a feeder in accordance with a first aspect of the invention positioned to receive material discharged from the bucket into the material receiving apron and to convey the same to the material discharge end;
  a transport truck including a material transport volume positioned to receive material from the material discharge end of the feed device.

Similarly in accordance with the invention in a third aspect, a method for the movement of material such as overburden or mineral from a working site comprises:
  providing a feeder comprising:
  a feed device having:
  a material receiving end having a material receiving apron suitable for receiving material such as overburden or mineral at a working site;
  a material discharge end distal of the material receiving end;
  an endless conveyor disposed between the material receiving apron and the discharge end so as in use to cause material received at the material receiving apron to be conveyed to the material discharge end;
  a chassis supporting the feed device;
  a transport carriage supporting the chassis and adapted to cause the feeder to be movable across a surface for deployment in use;
  moving the feeder into position at a work front at the working site;
  picking up material from the work front;
  transferring material to the material receiving apron;
  conveying material to the discharge end of the feeder.

More specifically the method may comprise:
  providing a material shovel at a work front;
  moving the feeder into position with the material receiving apron adjacent the material shovel;

positioning a transport truck including a material transport volume to receive material from the material discharge end of the feed device;

picking up material from the work front using the bucket of a material shovel;

transferring material from the bucket of the material shovel to the material receiving apron;

conveying material to the discharge end of the feeder and thereby into the material transport volume of the truck.

The key to all aspects of the invention is the provision of the mobile surge feeder between the shovel and the truck. This facilitates more even loading of the truck, and makes it more likely that load levels of nearer 100% can be achieved. For example fill levels of more than 90% and more preferably at least 95-98% are achievable, which is not typically achievable by batch filling using conventional shovel fill protocols. The processing capacity of the surge feeder may be designed to be such relative to the cycle time of the shovel that the shovel operator cannot overwhelm it, allowing for effectively continuous operation of the shovel.

Subject to provision of this mobile surge conveyor feeder in accordance with the first aspect of the invention for use between the shovel and the truck in a system and method of the second and third aspects of the invention, the shovel and the truck themselves may be of conventional known design.

In a preferred use of the feeder of the first aspect of the invention, a preferred system of the second aspect, or a preferred method of the third aspect, the material receiving end of the feed device may be positioned to be supplied and may be supplied with material such as overburden/mineral directly from the shovel. The material discharge end of the feed device may be positioned to supply and may supply material such as overburden/mineral directly to a truck.

Alternatively supply of material such as overburden from the shovel to the receiving end of the feed device and/or supply of material such as overburden/mineral from the discharge end of the feed device to a truck my be indirect in the sense that it passes via intermediate equipment. For example in a possible embodiment or use a sizer may be interposed between and process material passing between the shovel and the receiving end of the feed device. Thus, the system and method may be adapted for handling of run of mine or sized material, and is not restricted by particular material size.

The material receiving apron of the feed device is for example a material receiving hopper. The material receiving hopper may have a capacity and/or a shape generally matched to the capacity and/or shape of a material transport volume of the truck with which it is intended to be used.

The feeder is conformed as a surge conveyor feeder by provision of an endless conveyor disposed between the material receiving apron and the discharge end so as in use to cause material received at the material receiving apron to be conveyed to the material discharge end. The endless conveyor is for example an endless belt conveyor or apron/plate feeder.

The feeder is provided with a chassis supporting the feed device and a transport carriage supporting the chassis and adapted to cause the feeder to be movable across a surface for deployment in use. The feeder is thus adapted for use as a mobile surge conveyor unit, and may be deployed in use into optimum location for more efficient operation of a truck-shovel loading protocol.

The transport carriage in a possible embodiment includes one or more ground contactable transport arrangements adapted to effect movement of the feeder across a ground surface in use. For example the transport carriage may include a pair of parallel, driven, ground-engaging tracks.

In a possible embodiment the transport carriage may include a pair of parallel, separately driven ground-engaging tracks and one or more control devices for selectively driving the respective said tracks at different speeds so as to effect steering of the transport carriage.

In a possible embodiment the chassis may be rotatably supported on the transport carriage to permit rotation of the chassis and feeder thereon relative to the transport carriage.

The shovel is preferably also mobile. For example the shovel may include a mounting chassis, transport carriage and drive arrangement as suggested for the surge feeder hereinabove.

A system in accordance with the second aspect of the invention preferably includes a sensor system to sense fill level as a truck is filled. Conveniently a feeder in accordance with the first aspect of the invention includes a sensor system to sense fill level as a truck is filled in use. Conveniently such a sensor system is adapted co-operably with a conveyor control system to cause the conveyor of the feeder device to pause when a truck is detected as being full, allowing an empty truck to be positioned in replacement. The processing capacity of the apron is preferably such as to allow for continuous operation of the shovel during this period.

Additionally or alternatively, a system in accordance with the second aspect of the invention and conveniently a feeder in accordance with the first aspect of the invention includes a sensor system to sense distribution of load within the truck. Conveniently such a sensor system is adapted co-operably with a conveyor control system to cause the conveyor of the feeder device to distribute material more evenly into a transport volume of the truck.

The use of sensors may have advantage in some cases for example in facilitating the automation of the process. However in a possible alternative mode of operation manual signaling may be used as an alternative to sensors to monitor fill levels and fill distributions.

BRIEF DESCRIPTION OF THE DRAWINGS

In the drawings, which illustrate an exemplary embodiment of the invention.

DETAILED DESCRIPTION OF THE ILLUSTRATED EMBODIMENT

Figure 1:
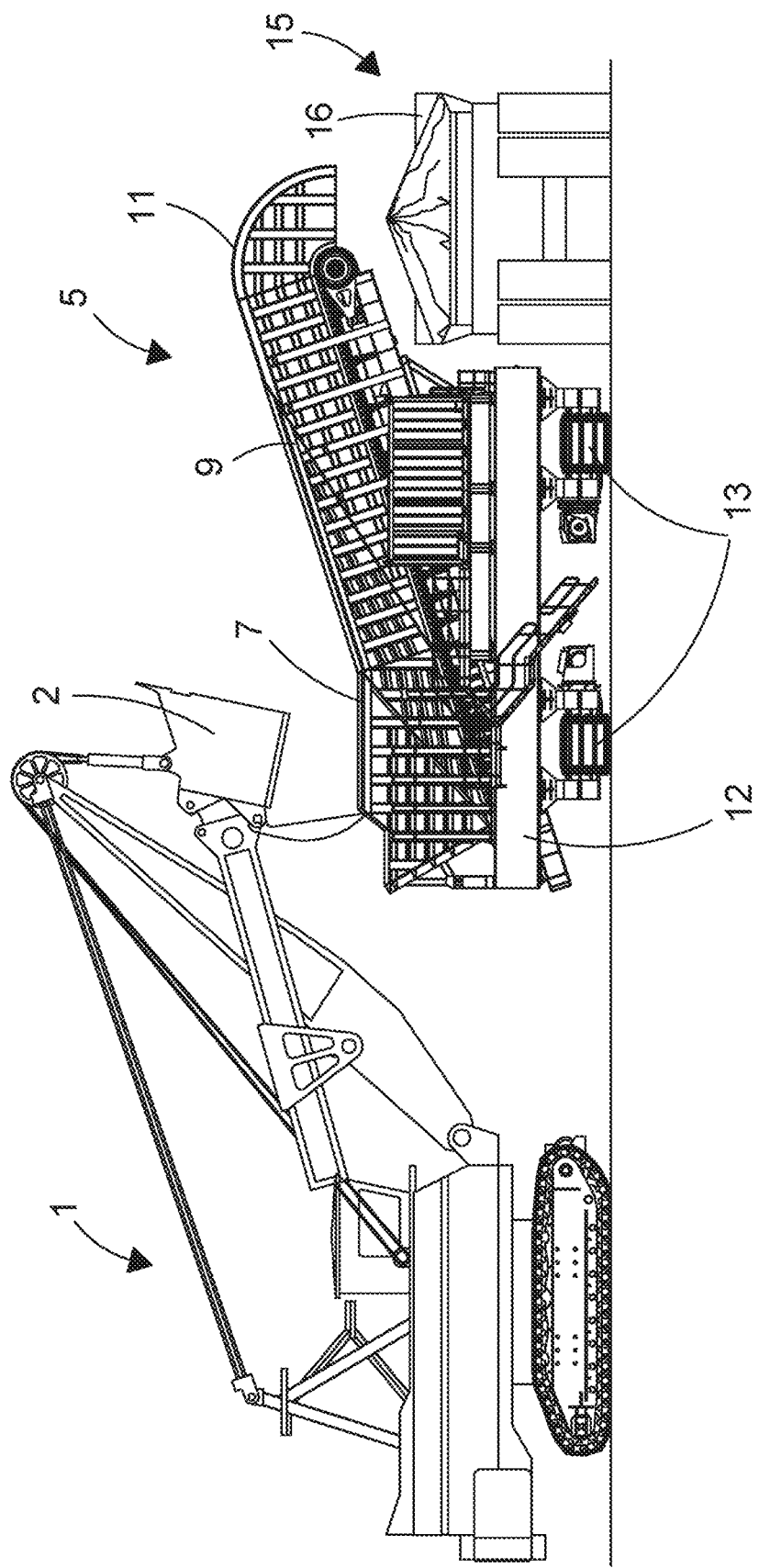
FIG. 1 is a diagrammatic side elevation of the feeder of the first aspect of the invention in an example use with other apparatus thereby constituting an embodiment of the system of the second aspect of the invention and illustrative of an embodiment of the method of the third aspect of the invention.

In the illustration in FIG. 1, a possible system embodying the principles of the second aspect of the invention is shown. A mobile shovel 1, mobile surge feeder 5 constituting a possible embodiment of the first aspect of the invention, and a truck 15 are shown positioned left to right in series. A typical mobile shovel 1 and truck 15 are shown, but the system may employ known suitable designs without departing from the principles of the invention.

Figure 2:
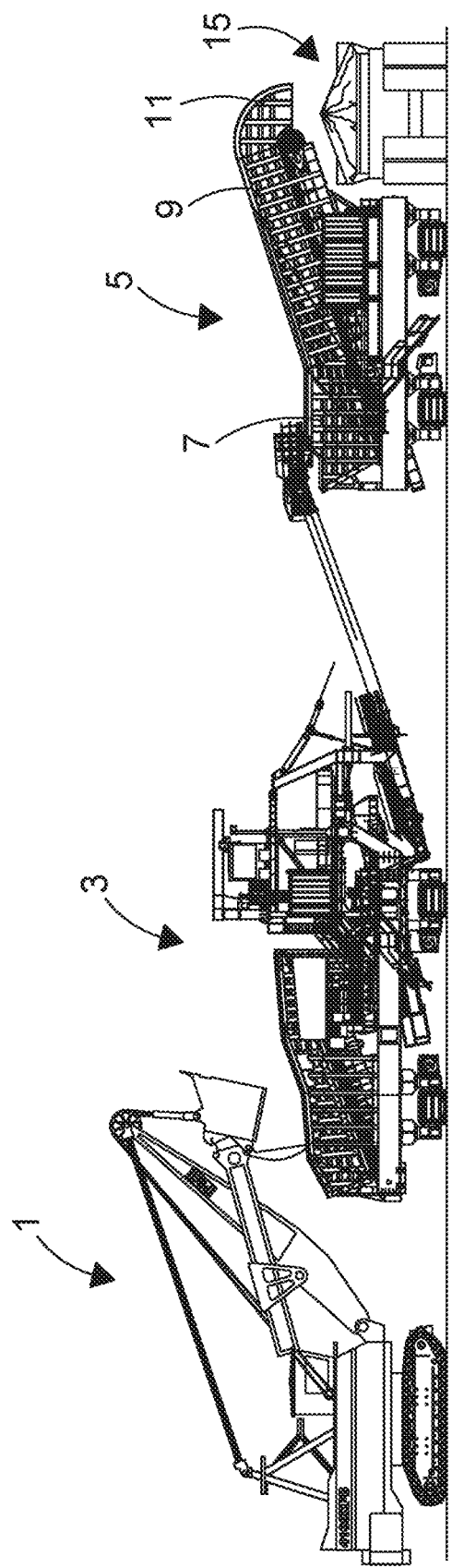
FIG. 2 is a diagrammatic side elevation of the feeder of the first aspect of the invention in an example use with an alternative arrangement of other apparatus thereby constituting an alternative embodiment of the system of the second aspect of the invention and illustrative of an alternative embodiment of the method of the third aspect of the invention.

In the FIG. 2 arrangement an additional optional piece of equipment constituting a mobile mineral sizer 3 is disposed between the shovel 1 and receiving hoper 7 and an apron end of the surge feeder 5. Otherwise the apparatus in the illustrated embodiment is the same as in FIG. 1 and like reference numerals are used.

Other alternative additional processing apparatus may be positioned here or else where within the system without departing from the principles of the invention, or such additional processing apparatus may be dispensed with altogether as shown in FIG. 1.

Overburden/mineral material is removed by the shovel 1 in conventional manner. In the illustrated embodiment of FIG. 1 it is passed directly to the surge feeder 5 from the bucket 2 of the mobile shovel 1 directly to the hopper 7 of the surge feeder 5. In the illustrated embodiment of FIG. 2 it is passed indirectly to the surge feeder 5, in that it is first provided to the mobile sizer apparatus 3 for initial processing.

In either mode of operation, overburden/mineral material is supplied by the shovel, directly or indirectly, to the hopper 7 in the apron region of the surge feeder 5. It is conveyed via an endless conveyor belt 9 to a discharge end 11 where a truck 15 waits to receive it into its load volume 16.

The surge feeder is additionally distinctive characterized in being mobile, by virtue of being mounted on a chassis 12 and provided with parallel ground engaging tracks 13.

The shovel and the truck may be of generally conventional design. Open cast mining operations are constantly seeking more flexible solutions to match truck and shovel capacities and processing rates and to improve fill level accuracy and efficiency in particular. In direct loading systems, where a shovel such as illustrated in the embodiment loads a truck directly batch by batch, trucks rarely reach 90% load and load rates of say 6000 tons per hour might be typical where a shovel might in principle have a capacity of 10000 tons per hour because of delays as each truck is replace. The surge feeder of the invention provides an admirable solution.

The surge feeder is positioned between the shovel and the truck. The surge feeder is able continuously to process overburden/mineral from the shovel and provide it to load a truck. The mobile arrangement of surge feeder enables a truck to drive alongside the surge feeder output end eliminating the need for it to reverse into position directly adjacent the shovel. This potentially improves truck movement efficiency.

The key to the solution of the invention is the provision of a surge feeder which is made mobile so that it can move along with the shovel, allowing the operation to use the shovel to its maximum capacity. The surge feeder is positioned between the shovel and the truck, and is therefore able to continuously to process overburden/mineral supplied by the shovel, whether directly to its apron region or indirectly via intermediate processing equipment. The surge feeder is drivable on its tracks and pivotable on its chassis allowing it to be positioned optimally to feed the trucks progressively. A truck need never to reverse into position. It can merely position itself alongside. The processing capacity of the surge feeder is designed to be greater than that of the shovel, so that the shovel can operate continuously.

Loading the trucks via the surge feeder offers potential efficiency advantages for a number of reasons. The more steady continuous operation allows for the possibility of more even loading, for higher fill levels, and avoids the shock loading effect of dropping 100 ton batches into the truck bed.

Advantages of such a system might include the following potential efficiency savings:

maximized volume of operation due to improved truck fill factors;

savings on operating expenses by reduction in unnecessary truck operation;

reduction of truck wear and tear and damage;

cleaner and more precise operation at the processing site, with a possible increase in truck tyre life with cleaner pit floors;

avoidance of damage to truck bodies by loading buckets.

The invention claimed is:

1. A mobile surge conveyor for use in an opencast mining operation, the mobile surge conveyor comprising:
    a surge-conveyor feed device comprising:
        a material receiving end having a material receiving apron suitable for receiving discrete batch-supplied material at a working site;
        a material discharge end distal of the material receiving end; and
        an endless conveyor disposed between the material receiving apron and the material discharge end so as in use to cause the discrete batch-supplied material received at the material receiving apron to be conveyed to the material discharge end and discharged as a more even continuous supply;
    a chassis supporting the surge-conveyor feed device; and
    a transport carriage supporting the chassis and adapted to cause the mobile surge conveyor to be movable across a surface for deployment in use.

2. The mobile surge conveyor in accordance with claim 1 wherein the material receiving end of the surge-conveyor feed device is positioned to be supplied with material directly from a material handling shovel, and wherein the material discharge end of the surge-conveyor feed device is positioned to supply material directly to a truck.

3. The mobile surge conveyor in accordance with claim 1 wherein the endless conveyor comprises an endless belt conveyor or apron/plate feeder.

4. The mobile surge conveyor in accordance with claim 1 wherein the transport carriage comprises one or more ground contactable transport arrangements adapted to effect movement of the mobile surge conveyor across a ground surface in use.

5. The mobile surge conveyor in accordance with claim 4 wherein the transport carriage comprises a pair of parallel, driven, ground-engaging tracks.

6. The mobile surge conveyor in accordance with claim 1 wherein the chassis is rotatably supported on the transport carriage to permit rotation of the chassis and the surge-conveyor feed device relative to the transport carriage.

7. A system for movement of material from a working site, the system comprising:
    a material shovel comprising a bucket adapted to pick up material and move the material from a work front;
    a mobile surge conveyor in accordance with claim 1 positioned to receive material discharged from the bucket into the material receiving apron and to convey the material discharged from the bucket to the material discharge end; and
    a transport truck comprising a material transport volume positioned to receive material from the material discharge end of the mobile surge conveyor.

8. The system in accordance with claim 7 wherein the material receiving end of the surge-conveyor feed device is positioned to be supplied with material directly from the material shovel, and wherein the material discharge end of the mobile surge conveyor is positioned to supply material directly to the transport truck.

9. The system in accordance with claim 7 further comprising a material sizer wherein the material receiving end of the surge-conveyor feed device is positioned to be supplied with material from the material sizer.

10. The system in accordance with claim 7 further comprising a sensor system to sense fill level as a transport truck is filled.

11. The system in accordance with claim 7 further comprising a sensor system to sense distribution of load within the transport truck.

12. A method for movement of discrete batch-supplied material from a working site in an opencast mining operation, the method comprising:
providing a mobile surge conveyor comprising:
a surge-conveyor feed device having:
a material receiving end having a material receiving apron suitable for receiving the discrete batch-supplied material at a working site;
a material discharge end distal of the material receiving end;
an endless conveyor disposed between the material receiving apron and the material discharge end so as in use to cause the discrete batch-supplied material received at the material receiving apron to be conveyed to the material discharge end and discharged as a more even continuous supply;
a chassis supporting the surge-conveyor feed device; and
a transport carriage supporting the chassis and adapted to cause the mobile surge conveyor to be movable across a surface for deployment in use;
moving the mobile surge conveyor into position at a work front at the working site;
picking up material from the work front;
transferring material to the material receiving apron;
conveying material to the material discharge end of the surge-conveyor feed device; and
discharging the material as a more even continuous supply.

13. The method in accordance with claim 12 comprising:
providing a material shovel at a work front;
moving the mobile surge conveyor into position with the material receiving apron adjacent the material shovel;
positioning a transport truck including a material transport volume to receive material from the material discharge end of the surge-conveyor feed device;
picking up material from the work front using a bucket of a material shovel;
transferring material from the bucket of the material shovel to the material receiving apron; and
conveying material to the material discharge end of the mobile surge conveyor and thereby into the material transport volume of the transport truck.

14. The method in accordance with claim 12 wherein the material receiving end of the surge-conveyor feed device is supplied with material directly from a material handling shovel, and wherein the material discharge end of the surge-conveyor feed device supplies material directly to a truck.

15. The method in accordance with claim 12 further comprising first supplying overburden or mineral at a working site to a sizer wherein the material receiving end of the surge-conveyor feed device is positioned to be supplied with material from the sizer.

16. The mobile surge conveyor of claim 1, wherein the surge-conveyor feed device is adapted to pause the endless conveyor.

17. The mobile surge conveyor of claim 16, wherein the pause is responsive to detection of a truck as full of material.

18. The mobile surge conveyor of claim 16, wherein the surge-conveyor feed device comprises:
a conveyor control system that controls operation of the surge-conveyor feed device; and
a sensor system interoperably coupled to the conveyor control system.

19. The system of claim 7, wherein the mobile surge conveyor is adapted to pause the endless conveyor.

20. The system of claim 19, wherein the pause is responsive to detection of the transport truck as full of material.

21. The system of claim 19, wherein the mobile surge conveyor comprises:
a conveyor control system that controls operation of the surge-conveyor feed device; and
a sensor system interoperably coupled to the conveyor control system.

22. The method of claim 12, comprising pausing the conveying.

23. The method of claim 22, comprising:
sensing an event; and
wherein the pausing is responsive to the sensing.

24. The method of claim 23, wherein the event is a truck being full of discrete batch- supplied material.

* * * * *